United States Patent
Gamlin et al.

(10) Patent No.: US 9,012,358 B2
(45) Date of Patent: Apr. 21, 2015

(54) MONOLITHIC REACTOR

(75) Inventors: Timothy Douglas Gamlin, London (GB); Richard Spratt, Thornaby (GB)

(73) Assignee: Davy Process Technology Limited, London (GB)

( * ) Notice: Subject to any disclaimer, the term of this patent is extended or adjusted under 35 U.S.C. 154(b) by 48 days.

(21) Appl. No.: 13/580,920

(22) PCT Filed: Feb. 6, 2012

(86) PCT No.: PCT/GB2012/050257
§ 371 (c)(1),
(2), (4) Date: Oct. 25, 2012

(87) PCT Pub. No.: WO2012/136971
PCT Pub. Date: Oct. 11, 2012

(65) Prior Publication Data
US 2014/0018451 A1    Jan. 16, 2014

(30) Foreign Application Priority Data
Apr. 4, 2011 (GB) .................................. 1105691.8

(51) Int. Cl.
*B01J 19/24* (2006.01)
*B01J 15/00* (2006.01)
*B01J 8/06* (2006.01)
*B01J 35/04* (2006.01)

(52) U.S. Cl.
CPC *B01J 15/005* (2013.01); *B01J 8/06* (2013.01); *B01J 19/2485* (2013.01); *B01J 35/04* (2013.01); *B01J 2219/2424* (2013.01); *B01J 2219/2443* (2013.01); *Y10S 502/52711* (2013.01); *Y10S 502/52724* (2013.01)

(58) Field of Classification Search
USPC .................. 502/439, 527.11, 527.18, 527.24
See application file for complete search history.

(56) References Cited

U.S. PATENT DOCUMENTS

2010/0254864 A1    10/2010    Itsuki et al.

FOREIGN PATENT DOCUMENTS

| EP | 1216751 A1 | 6/2002 |
| WO | 2010141352 A1 | 12/2010 |
| WO | 2011048361 A1 | 4/2011 |

OTHER PUBLICATIONS

International Search Report and Written Opinion for PCT/GB2012/050257, dated May 15, 2012.
International Preliminary Report on Patentability and Written Opinion for PCT/GB2012/050257 dated Oct. 17, 2013; 8 pages.

*Primary Examiner* — Edward Johnson
(74) *Attorney, Agent, or Firm* — Armstrong Teasdale LLP

(57) ABSTRACT

A monolith catalyst carrier for insertion in a tube of a tubular reactor has a container for holding a monolith catalyst in use. The container has a bottom surface closing the container and a skirt extending upwardly from the bottom surface of the container to a position below the location of a seal and spaced therefrom. The skirt is positioned such that there is a space between an outer surface of the monolith catalyst and the skirt. A seal is located at or near a top surface of the monolith catalyst and extends from the monolith catalyst by a distance which extends beyond an outer surface of the skirt.

17 Claims, 2 Drawing Sheets

MONOLITHIC REACTOR

The present invention relates to a catalyst carrier for use in a tubular reactor. More particularly, it relates to a catalyst carrier for use in a tubular reactor in which an exothermic or an endothermic reaction is to be carried out. Still more particularly, it relates to a catalyst carrier for use in a reactor for carrying out an exothermic or endothermic reaction comprising a plurality of said catalyst carriers.

Tubular reactors comprise tubes, which are usually cylindrical, and which are usually randomly filled with catalyst particles. A heat transfer means will be located outside these tubes. During operation, gas, liquid, or both gas and liquid flows through the tubes over the catalyst particles such that the desired reaction takes place.

For many reactions, the heat effects of the reaction are moderate. In such circumstances large-diameter tubes may be used such that there is a large volume of catalyst across the tube. However, for more exothermic or endothermic reactions it is necessary that there is efficient heat transfer via the tube wall to control the conditions within the reactor. This means that the number of particles of catalyst across the tube and hence the cross-sectional area of the tube must be reduced.

Tubular reactors in which moderate to highly exothermic reactions take place are in many cases heat transfer limited. One disadvantage of this is that the benefits of more active catalysts are difficult to realise since the increased productivity generates increased amounts of heat which must be removed at a rate that maintains a stable operating temperature and thus avoid thermal runaway. Where the reaction is a moderate to highly endothermic reaction, problems can arise with increased heating and in some systems damage to the tube wall can occur.

Known reactors have a number of drawbacks that make them less than ideal. One problem that is noted for these reactors is that in order to extract the heat of reaction effectively the tubes have to be relatively small in diameter to ensure that the centre line of the tube remains cool enough to avoid thermal runaway in an exothermic reaction or quenching in an endothermic reaction. Since the tubes have to be relatively small, generally of the order of 15 to 40 mm internal diameter, this significantly increases the number and hence weight of the tubes in the reactor needed to contain a specific catalyst volume and thus limits the productivity of a single reactor of reasonable shipping dimensions and weight.

A second problem is that the catalyst particles have to be a certain size, shape and strength so as not to cause an undue pressure drop for an appropriate tube length and in general this leads to the use of larger catalyst particles. This in itself may be problematic where the reaction is mass or heat transfer limited, or both. Whilst some of these problems may be alleviated by ensuring that the active sites are only present near the surface of the catalyst particle, this can limit the productivity that can be achieved since the available active sites have to be worked harder to deliver a reasonable overall productivity which can reduce the life of the catalyst.

It was therefore desirable to provide a means of using larger cross-sectional area tubes with powdered or high surface area structured or foamed catalysts operating at high productivities which therefore have high heat output while maintaining long tubes, of the order of 20 m, and an acceptable pressure drop.

A solution to this problem is provided in GB application no 0918426.0 by a catalyst carrier device which is configured to sit within the reactor tube and which in use optimises heat transfer at the tube wall such that larger tubes can be used with larger volumes of smaller catalyst particles and such that the reactor can be operated at high productivity even in exothermic or endothermic reactions, and with an acceptable pressure drop.

The described arrangement provides a catalyst carrier for insertion in a tube of a tubular reactor comprising:
   an annular container for holding catalyst in use, said container having a perforated inner wall defining a tube, a perforated outer wall, a top surface closing the annular container and a bottom surface closing the annular container;
   a surface closing the bottom of said tube formed by the inner wall of the annular container;
   a skirt extending upwardly from the perforated outer wall of the annular container from a position at or near the bottom surface of said container to a position below the location of a seal; and
   a seal located at or near the top surface and extending from the container by a distance which extends beyond an outer surface of the skirt.

Whilst this solution provides numerous benefits over prior art arrangements, its application is generally directed to processes in which particulate catalysts are used. However, in some reactions, such as Fischer-Tropsch steam reforming and hydrogenation monolith catalysts may be used. Whilst these monolith catalysts may in some circumstances have benefits over particulate catalysts, these monoliths still have problems associated with heat transfer to, or from, the centre of the body of the monolith. Although metal monoliths have improved heat transfer over ceramic monoliths, there is still a limit on the amount of heat that can be conducted to or from the reaction in the centre of the monoliths. Whilst monolith catalysts can be used in the catalyst carrier of GB application no 0918426.0, it has now been found that where a monolith catalyst is used, the perforated inner and outer walls may be omitted.

Thus according to the present invention there is provided, a monolith catalyst carrier for insertion in a tube of a tubular reactor comprising:
   a container for holding a monolith catalyst in use, said container having a bottom surface closing the container and a skirt extending upwardly from the bottom surface of said container to a position below the location of a seal and spaced therefrom, said skirt being positioned such that there a space between an outer surface of the monolith catalyst and the skirt; and
   a seal located at or near a top surface of the monolith catalyst and extending from the monolith catalyst by a distance which extends beyond an outer surface of the skirt.

For the avoidance of doubt, any discussion of orientation, for example terms such as upwardly, below, lower, and the like have, for ease of reference been discussed with regard to the orientation of the catalyst carrier as illustrated in the accompanying drawings. However, the catalyst carrier of the present invention could also be used in an alternative orientation for example horizontally. Thus the terms should be constructed accordingly.

The container will generally be sized such that it is of a smaller dimension than the internal dimension of the reactor tube into which it is to be placed in use. The seal will be sized such that it interacts with the inner wall of the reactor tube when the catalyst carrier of the present invention is in position within the tube. Parameters such as carrier length and diameter will be selected to accommodate different reactions and configurations.

In one arrangement, the monolith catalyst is a solid, in that there is substantially no space within the body of the monolith that is not occupied by catalyst. When the monolith is in use in a vertical reactor with downflow, the reactant(s) flow downwardly through the reactor tube, the reactant(s) first contacts the upper face of the monolith catalyst and flows therethrough in a direction parallel to the axis of the cylinder. The seal of the container prevents the reactant(s) from flowing around the monolith and assists the direction of the reactants into the catalyst. Reaction will then occur within the monolith catalyst. The product will then also flow down through the monolith in a direction parallel to the axis of the cylinder.

Once the reactant(s) and product reach the bottom surface of the catalyst carrier they are directed towards the skirt of the carrier. To facilitate this flow, feet may be provided within the carrier on the upper face of the bottom surface such that, in use, the catalyst monolith is supported on the feet and there is a gap between the bottom of the catalyst monolith and the bottom surface of the catalyst carrier. The upwardly extending skirt then directs the reactant(s) and product upwardly between the inner surface of the skirt and the outer surface of the monolith catalyst until they reach the underside of the seal. They are then directed, by the underside of the seal, over the end of the skirt and they then flow downwardly between the outer surface of the skirt and the inner surface of the reactor tube where heat transfer takes place.

In one alternative arrangement, the monolith catalyst has a channel extending longitudinally therethrough. Generally the channel will be located on the central axis of the monolith catalyst. Thus where the reactor tube is of circular cross-section, the monolith catalyst of this arrangement will be of annular cross-section. In this arrangement, in use, in a vertical reactor with downflow, reactant(s) flow downwardly through the reactor tube and thus first contacts the upper surface of the monolith catalyst. The seal blocks the passage of the reactant(s) around the side of the catalyst. Since the path of flow of reactant(s) is impeded by the catalyst, it will generally take the easier path and enter the channel in the monolith. The reactant(s) then enters the annular monolith catalyst and passes radially through the catalyst towards the outer surface of the catalyst monolith. During the passage through the catalyst monolith reaction occurs. Unreacted reactant and product then flow out of the monolith catalyst though the outer surface thereof. The upwardly extending skirt then directs reactant and product upwardly between the inner surface of the skirt and the outer wall of the monolith catalyst until they reach the seal. They are then directed, by the underside of the seal, over the end of the skirt and flow downwardly between the outer surface of the skirt and the inner surface of the reactor tube where heat transfer takes place.

In the arrangement in which the monolith catalyst includes the channel, the catalyst carrier may include a top surface which will extend over the monolith catalyst but leave the channel uncovered. This top surface serves to ensure that the reactant(s) do not enter the catalyst monolith from the top but are directed into the channel for radial flow.

It will be understood that where the reactor is an upflow reactor or is, for example, in a horizontal orientation, the flow path will differ from those described above. However the principle of the paths through the container and monolith catalysts will be as described.

Generally, a plurality of catalyst carriers will be stacked within a reactor tube. In this arrangement, the reactants/products flow downwardly between the outer surface of the skirt of a first carrier and the inner surface of the reactor tube until they contact the upper surface of the monolith catalyst and seal of a second carrier and are directed downwardly through the second monolith catalyst using the flow paths described above.

The catalyst carrier may be formed of any suitable material. Such material will generally be selected to withstand the operating conditions of the reactor. Generally, the catalyst carrier will be fabricated from carbon steel, aluminium, stainless steel, other alloys or any material able to withstand the reaction conditions. In an alternative arrangement the catalyst carrier may be formed from non-metallic materials.

The components of the container can be of any suitable thickness. Suitable thicknesses will be of the order of about 0.1 mm to about 1.0 mm, preferably of the order of about 0.3 mm to about 0.5 mm.

In the arrangement where the monolith catalyst has the longitudinal channel, the surface closing the bottom of the tube may be formed as a single unit or they may be two separate pieces connected together. The two surfaces may be coplanar but in a preferred arrangement, they are in different planes. In one arrangement, the portion of the bottom of the tube beneath the longitudinal channel is in a lower plane than the bottom surface of the remainder of the container. This serves to assist in the location of one carrier onto a carrier arranged below it when a plurality of containers are to be used. It will be understood that in an alternative arrangement, the surface of the bottom aligned with the channel of the tube may be in a higher plane that the bottom surface of the remainder of the container.

Whilst the bottom surface will generally be solid, it may include one or more drain holes. Where one or more drain holes are present, they may be covered by a filter mesh. Similarly a drain hole, optionally covered with a filter mesh may be present in the surface closing the bottom of the tube. Where the carrier is to be used in a non-vertical orientation, the drain hole, where present will be located in an alternative position i.e. one that is the lowest point in the carrier when in use.

One or more spacer means may extend downwardly from the bottom surface of the container. The, or each, spacer means may be formed as separate components or they may be formed by depressions in the bottom surface. Where these spacer means are present they assist in providing a clear path for the reactants and products flowing between the bottom surface of the first carrier and the top surface of a second lower carrier in use. The spacer may be of the order of about 4 mm to about 6 mm deep. Alternatively, or additionally, spacer means may be present on the top surface of the container where present or may extend upwardly from the seal.

The seal, or where present, the top surface may include on its upper surface means to locate the container against a catalyst carrier stacked above the container in use. The means to locate the container may be of any suitable arrangement. In one arrangement it comprises one or more upstanding collars having apertures or spaces therein to allow for the ingress of reactants. The means may act as baffles to direct the flow.

The upwardly extending skirt may be smooth or it may be shaped. Any suitable shape may be used. Suitable shapes include pleats, corrugations, and the like. The pleats, corrugations and the like will generally be arranged longitudinally along the length of the carrier. The shaping of the upstanding skirt increases the surface area of the skirt and assists with the insertion of the catalyst carrier into the reaction tube since it will allow any surface roughness on the inner surface of the reactor tube or differences in tolerances in tubes to be accommodated.

Where the upwardly extending skirt is shaped, it will generally be flattened to a smooth configuration towards the point at which it is connected to the bottom surface to allow a gas seal to be formed therewith. The upstanding skirt may be flexible.

Generally, the upstanding skirt will stop at about 0.5 cm to about 1.5 cm, preferably about 1 cm, short of the top surface of the monolith catalyst.

Without wishing to be bound by any theory, it is believed that the upstanding skirt serves to gather the reactants/products from the outer surface of the annular container and direct them via the shapes towards the top of the catalyst carrier collecting more reactants/products exiting from the outer surface of the monolith catalyst as they move upwardly. As described above, reactants/products are then directed down between the tube wall and the outside of the upstanding skirt. By this method the heat transfer is enhanced down the whole length of the carrier but as the heat exchange is separated from the catalyst, hotter or colder as appropriate heat exchange fluid can be used without quenching the reaction at the tube wall and at the same time ensuring that the temperature of the catalyst towards the centre of the carrier is appropriately adjusted.

The seal may be formed in any suitable manner. However, it will generally be sufficiently compressible to accommodate the smallest diameter of the reactor tube. The seal will generally be a flexible, sliding seal. In one arrangement, an O-ring may be used. A compressible split ring or a ring having a high coefficient of expansion could be used. The seal may be formed of any suitable material provided that it can withstand the reaction conditions. In one arrangement, it may be a deformable flange extending from the carrier. The flange may be sized to be larger than the internal diameter of the tube such that as the container is inserted into the tube it is deformed to fit inside and interact with the tube.

One advantage of the present invention is that catalyst can be provided to the user within the carriers of the present invention which can then be readily installed within the reactor tubes with minimum downtime. Thus catalyst may be loaded into the catalyst carrier at the catalyst manufacturing site. It may be pre-reduced and stabilised or encapsulated obviating the need for catalyst handling on site. One the catalyst is spent, the carriers can be readily removed from the reactor as discrete units and readily transported for disposal or regeneration as appropriate.

The catalyst carrier of the present invention allows the use catalysts for use in highly exothermic or endothermic reactions. The device allows the use of large tubes leading to large weight and cost reductions for a reactor of a given capacity since heat transfer effectively takes place in a micro-channel zone at the tube wall. This gives excellent heat transfer to or from the cooling/heating medium. Furthermore, as the catalyst is separated from the cooling/heating medium, a larger temperature difference can be allowed as the heat exchange effect is separated from the reaction. Where a plurality of carriers of the present invention is inserted into a tube this effectively provides a plurality of adiabatic reactors in series in each tube.

The catalyst carrier may be used in a wide range of processes. Examples of suitable processes include reactors for exothermic reactions such as reactions for the production of methanol, reactions for the production of ammonia, methanation reactions, shift reactions, oxidation reactions such as the formation of maleic anhydride and ethylene oxide, Fischer-Tropsch reactions, and the like. Endothermic reactions such as pre-reforming, dehydrogenation and the like can be carried out in reactors including the catalyst carriers of the present invention.

The monolith catalyst carrier of the present invention may be filled or partially filled with any suitable catalyst.

According to a second aspect of the present invention there is provided a reactor tube comprising a plurality of catalyst carriers of the above-mentioned first aspect of the present invention.

According to a third aspect of the present invention there is provided a reactor comprising one or more of the reactor tubes of the above second aspect.

According to a fourth aspect of the present invention there is provided a process for carrying out a reaction wherein the reactants enter into a catalyst carrier of the above first aspect, a reactor tube of the above second aspect, or a reactor of the above third aspect.

The catalyst carriers of the present invention allow longer reactor tubes to be used than has been possible heretofore.

The present invention will now be described, by way of example, with reference to the accompanying drawings in which.

For a general overview of the catalyst carriers reference can be made to the figures included in GB patent application no 0918426.0 the contents of which are incorporated herein by reference. In particular reference can be made to the illustrations therein for the skirt arrangements.

Figure 1:
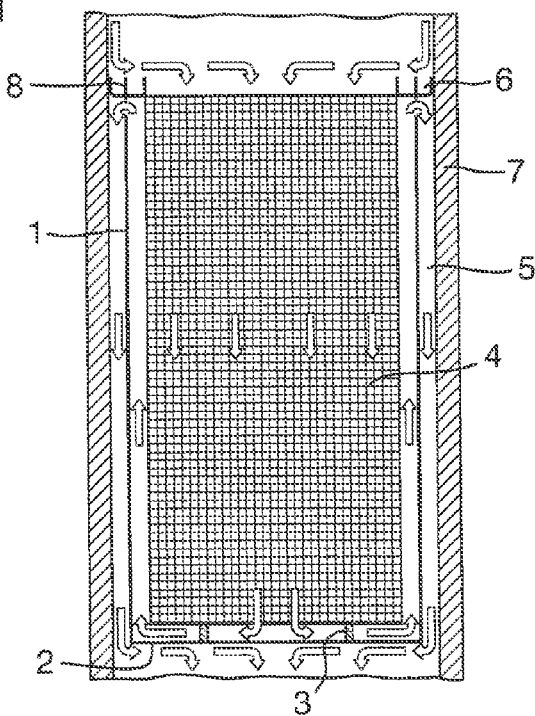
FIG. 1 is a schematic representation of one embodiment of the present invention, illustrating the flow path.

A catalyst carrier 1 of one embodiment of the present invention is illustrated in FIG. 1. A bottom surface 2 closes the bottom of the container 1. Feet 3 extend upwardly from the bottom surface to support the monolith catalyst 4.

An upstanding skirt 5 extends from the bottom surface 2. The skirt may be corrugated and may be flattened as in a region towards the bottom surface 3.

A seal 6 is provided to extend from the monolith catalyst 4 and interact with the wall of the reactor tube 7. Baffles 8 extend upwardly for the seal. These serve to direct flow and to separate the carrier from the bottom surface of a carrier located above the carrier. The flow of gas is illustrated schematically by the arrows.

Figure 2:
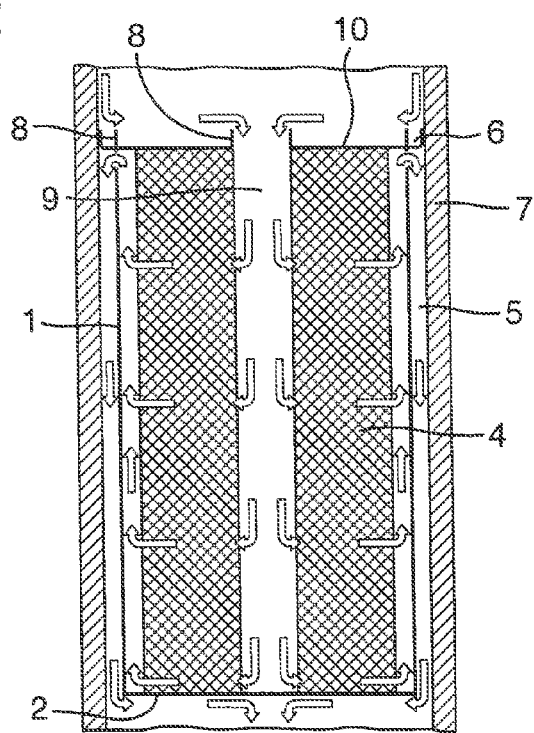
FIG. 2 is a schematic representation of a second embodiment of the present invention, illustrating the flow path.

An alternative embodiment of the present invention is illustrated in FIG. 2. In this arrangement the monolith catalyst 4 has a longitudinal channel 9 therethrough. In this arrangement, the feet of the first embodiment may be omitted. This carrier is similar in arrangement to the first embodiment. However, additionally a top surface 10 is provided to cover the upper surface of the monolith catalyst. The flow of gas in the arrangement of FIG. 2 is illustrated schematically by the arrows.

Figure 3:
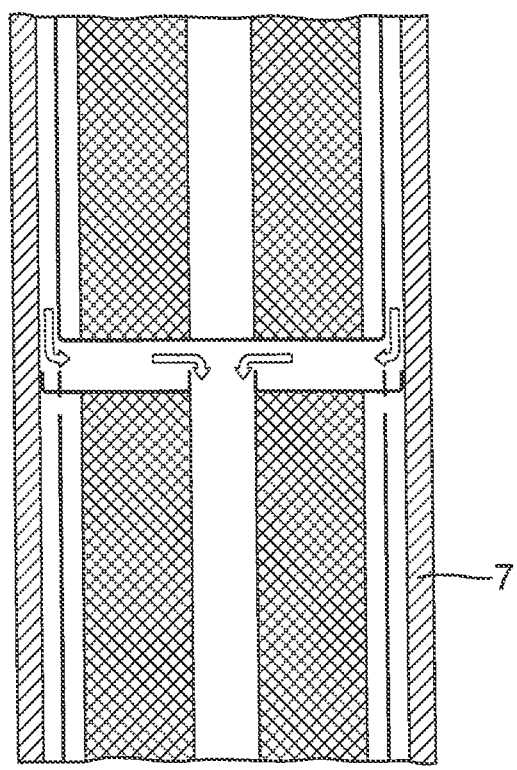
FIG. 3 is a schematic representation of the flow path between two stacked carriers.

When a plurality of catalyst carriers of the present invention are located within a reactor tube 7 the effect on the flow path is illustrated in the enlarged section shown in FIG. 3.

It will be understood that whilst the catalyst carrier has been described with particular reference to a use in a tube of circular cross-section the tube may be of non-circular cross-section for example, it may be a plate reactor. Where the tube is of non-circular cross-section, the carrier will be of the appropriate shape. In this arrangement, the embodiment described in which an annular monolith is used will not be a circular ring and this term should be construed accordingly.

It will be further understood that in certain circumstances, the skirt of the carrier may be omitted. This arrangement may be suitable in situations where the exothermic/endothermic reaction does not shift the temperature significantly.

The invention claimed is:

1. A monolith catalyst carrier for insertion in a tube of a tubular reactor comprising:
   a container for holding a monolith catalyst in use, said container having a bottom surface closing the container and a skirt extending upwardly from the bottom surface of said container to a position below the location of a seal and spaced therefrom, said skirt being positioned such that there is a space between an outer surface of the monolith catalyst and the skirt; and
   a seal located at or near a top surface of the monolith catalyst and extending from the monolith catalyst by a distance which extends beyond an outer surface of the skirt.

2. A monolith catalyst carrier according to claim 1 wherein the monolith catalyst is a solid.

3. A monolith catalyst carrier according to claim 1 additionally including feet on the upper face of the bottom surface.

4. A monolith catalyst carrier according to claim 1 wherein the monolith catalyst has a channel extending longitudinally therethrough.

5. A monolith catalyst carrier according to claim 4 wherein the monolith catalyst is of circular cross-section.

6. A monolith catalyst carrier according to claim 4 wherein the catalyst earner includes a top surface which, in use, will extend over the monolith catalyst but leave the channel uncovered.

7. A monolith catalyst carrier according to claim 1 wherein the bottom surface includes one or more drain holes.

8. A monolith catalyst carrier according to claim 1 wherein one or more spacer means extend downwardly from the bottom surface of the container.

9. A monolith catalyst carrier according to claim 1 wherein the seal, or where present, the top surface, include on its upper surface means to locate the container against a catalyst carrier stacked above the container in use.

10. A monolith catalyst carrier according to claim 1 wherein the upwardly extending skirt is shaped.

11. A monolith catalyst carrier according to claim 10 wherein the shaping on the upwardly extending skirt is corrugations.

12. A monolith catalyst carrier according to claim 10 wherein the shaping of the upwardly extending skirt is flattened to a smooth configuration towards the point, at which it is connected to the bottom surface.

13. A monolith catalyst carrier according to claim 1 including catalyst.

14. A reactor tube comprising a plurality of catalyst carriers of claim 1.

15. A reactor comprising one or more of the reactor tubes of claim 14.

16. A process for carrying out a reaction wherein the reactants enter into a catalyst carrier of claim 1.

17. A process according to claim 16 wherein the reaction is an exothermic reaction or an endothermic reaction.

* * * * *